(12) United States Patent
Sadaoka et al.

(10) Patent No.: US 8,119,232 B2
(45) Date of Patent: Feb. 21, 2012

(54) FLAKE COMPOUND

(75) Inventors: Kazuo Sadaoka, Toyonaka (JP); Takeshi Hattori, Abiko (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 80 days.

(21) Appl. No.: 12/525,745

(22) PCT Filed: Feb. 14, 2008

(86) PCT No.: PCT/JP2008/052916
§ 371 (c)(1),
(2), (4) Date: Aug. 4, 2009

(87) PCT Pub. No.: WO2008/099967
PCT Pub. Date: Aug. 21, 2008

(65) Prior Publication Data
US 2010/0062280 A1    Mar. 11, 2010

(30) Foreign Application Priority Data
Feb. 16, 2007   (JP) .................. 2007-035907

(51) Int. Cl.
*B32B 9/00*    (2006.01)

(52) U.S. Cl. ......... 428/325; 428/384; 428/701; 428/702
(58) Field of Classification Search .............. None
See application file for complete search history.

(56) References Cited

U.S. PATENT DOCUMENTS

| | | |
|---|---|---|
| 2001/0024718 A1 | 9/2001 | Sasaki et al. |
| 2004/0234447 A1 | 11/2004 | Inubushi et al. |
| 2006/0097230 A1 | 5/2006 | Hareyama et al. |
| 2008/0171224 A1 | 7/2008 | Yamamoto et al. |

FOREIGN PATENT DOCUMENTS

| | | |
|---|---|---|
| JP | 61-197422 A | 9/1986 |
| JP | 02-221106 A | 9/1990 |
| JP | 10-340629 A | 12/1998 |
| JP | 2001-270022 A | 10/2001 |
| JP | 2006-199556 A | 8/2006 |
| JP | 2006-291065 A | 10/2006 |

*Primary Examiner* — Timothy Speer
(74) *Attorney, Agent, or Firm* — Panitch Schwarze Belisario & Nadel LLP

(57) ABSTRACT

The present invention provides a flake compound which is useful for a conductive film. The flake compound comprises a conductive layer containing M and O, wherein M represents at least one metal element, preferably at least one transition metal element in mixed valent state.

6 Claims, No Drawings

FLAKE COMPOUND

TITLE OF THE INVENTION

Flake Compound

CROSS-REFERENCE TO RELATED APPLICATION

This application is a Section 371 of International Application No. PCT/JP2008/052916, filed Feb. 14, 2008, which was published in the Japanese language on Aug. 21, 2008, under International Publication No. WO 2008/099967 A1, and the disclosure of which is incorporated herein by reference.

TECHNICAL FIELD

The present invention relates to a flake compound. More particularly, the present invention relates to a flake compound used for a conductive film.

BACKGROUND ART

Flake compounds are investigated in various applications thereof, and for example, JP-A-2001-270022 discloses that a flake compound obtained by exfoliating microcrystals of a layered titanium oxide is used as an ultraviolet shielding material.

The flake compound disclosed in the publication, however, is not sufficient as a conductive material.

DISCLOSURE OF THE INVENTION

The present invention has an object of providing a flake compound useful for a conductive film.

The present inventors have intensively studied to solve the above-described problem, leading resultantly to completion of the present invention. That is, the present invention provides (1) to (7).

(1) A flake compound comprising a conductive layer containing M and O, wherein M represents at least one metal element.

(2) The flake compound according to (1), wherein M represents at least one transition metal element in mixed valent state.

(3) The flake compound according to (2), wherein M represents Ti in 3-valent state and 4-valent state.

(4) The flake compound according to (3), wherein the conductive layer contains Ti, metal element $M^1$ and O, the molar ratio of $M^1$/Ti is more than 0 and not more than 1, and $M^1$ represents at least one selected from the group consisting of Nb, Ta, Mo, W and Ru.

(5) The flake compound according to (3), wherein the conductive layer contains oxygen deficient type $TiO_2$.

(6) The flake compound according to any one of (1) to (5), further comprising a layer containing at least one element selected from the group consisting of alkali metal elements and alkaline earth metal elements.

(7) A conductive film comprising the flake compound as described in any one of (1) to (6).

MODES FOR CARRYING OUT THE INVENTION

The flake compound of the present invention includes a conductive layer containing M and O. M represents at least one metal element.

The flake compound is usually a compound in a flake form having a thickness of about 0.5 nm to about 1 μm and in which a ratio obtained by dividing the major diameter by the thickness (major diameter/thickness) is not lower than about 100. The thickness and major diameter may be advantageously measured by a scanning electron microscope (SEM) or transmission electron microscope (TEM).

The conductive layer usually has a thickness in the order of atom size, and for example, it is about 0.5 nm to about 5 nm. It is advantageous that the flake compound has one or more such conductive layers. The conductive layer contains M and O, and M is appropriately selected so that the conductive layer shows a conductive property. M represents Sn singly, or combinations such as Sn and Sb; In and Sn; Zn and Al; Cu and La. M preferably represents at least one transition metal element (for example, Mn, Ti, Cu, Ni, Fe, and Co) in mixed valent state, and from the standpoint of easy formation of layered form, M more preferably represents Ti in 3-valent and 4-valent state.

When M represents Ti in 3-valent and 4-valent state, preferable examples of the conductive layer include a layer which contains Ti, metal element $M^1$ and O, and has a molar ratio of $M^1$/Ti of more than 0 and not more than 1, and $M^1$ represents at least one selected from the group consisting of Nb, Ta, Mo, W and Ru. For more suitable use of the flake compound for a conductive layer, $M^1$ represents preferably Nb or Ta. The molar ratio of $M^1$/Ti is preferably not less than 0.05 and not more than 0.5, more preferably not less than 0.1 and not more than 0.25. When M represents Ti in 3-valent and 4-valent state, preferable examples of the conductive layer include a layer containing oxygen deficient type $TiO_2$. The oxygen deficient type $TiO_2$ can be specifically represented by $TiO_{2-\delta}$, wherein $\delta$ is more than 0 and less than 0.5. For more suitable use of the flake compound for a conductive layer, $\delta$ is preferably more than 0 and not more than 0.25.

The flake compound may further include a layer containing alkali metal elements or alkaline earth metal elements, preferably, alkali metals. These may be used singly or in combination with another or more.

A method for producing a flake compound is illustrated. The flake compound may be advantageously produced by, for example, a method in which a layer is formed by using a compound containing a conductive layer as a raw material, and the layer is exfoliated, a method in which a layer is formed by using a compound containing a layer not conducive as a raw material, the layer is exfoliated, and then, the layer is changed to be conductive. A method for producing a preferable flake compound in which M represents Ti in 3-valent and 4-valent state will be illustrated below.

When the conductive layer contains oxygen deficient type $TiO_2$, a flake compound may be advantageously produced by, for example, a method including steps of (A1) and (A2) in this order.

(A1) A compound having a layer containing Ti and O (hereinafter, referred to as compound A) is used as a raw material, a chemical treatment is carried out, and a flake compound is exfoliated.

(A2) The exfoliated flake compound is subjected to a reduction treatment.

Examples of the compound A in the step (A1) include lepidocrocite type titanate [$A_xTi_{2-x/4}O_4$ (A=K, Rb, Cs; $0.5 \leq x \leq 1$), $A_xTi_{2-x/3}Li_{x/3}O_4$ (A=K, Rb, Cs; $0.5 \leq x \leq 1$)], trititanate ($Na_2Ti_3O_7$), tetratitanate ($K_2Ti_4O_9$) and pentatitanate ($Cs_2Ti_5O_{11}$). These compounds include a layer containing Ti and O, and a layer containing an element selected from alkali metal elements and alkaline earth metal elements.

The chemical treatment in the step (A1) is a treatment in which raw materials in (A1) is contacted with an acidic aqueous solution such as hydrochloric acid to obtain a product, and the product is recovered, dried, and the resultant is contacted with a basic compound such as an amine to obtain a colloidal substance. By changing the acid concentration of the acidic aqueous solution, the content of alkali metals and alkaline earth metals in the flake compound can be controlled. Specifically, higher the acid concentration, lower the content of alkali metals and alkaline earth metals in the flake compound. Lower the content of them, thinner the flake compound. Higher the content of them, thicker of the flake compound, and the amount of the layer containing Ti and O increases. Examples of the acidic aqueous solution include inorganic acids such as hydrochloric acid, sulfuric acid, and nitric acid, and organic acids such as formic acid, acetic acid, propionic acid, and oxalic acid. Examples of the basic compound include at least one compound selected from among alkylamines such as methylamine, ethylamine, n-propylamine, diethylamine, triethylamine, butylamine, pentylamine, hexylamine, octylamine, dodecylamine and salts thereof, alkanolamines such as ethanolamine, diethanolamine, triethanolamine, isopropanolamine, diisopropanolamine, triisopropanolamine, 2-amino-2-methyl-1-propanol, quaternary ammonium hydroxides such as tetramethylammonium hydroxide, tetraethylammonium hydroxide, tetrapropylammonium hydroxide, tetrabutylammonium hydroxide and salts of them, and quaternary ammonium salts such as cetyltrimethylammonium salt, stearyltrimethylammonium salt, benzyltrimethylammonium salt, dimethyldistearylamine salt, dimethylstearylbenzylammonium salt.

In the step (A2), by subjecting the exfoliated flake compound to a reduction treatment, the layer containing Ti and O is changed to be conductive, and becomes a conductive layer. The flake compound is changed to be conductive. The reduction treatment may be advantageously carried out by a method in which Ti in the flake compound can be reduced. Examples of the method include a method in which the colloidal substance obtained in (A1) is contacted with a reducing agent, a method in which the colloidal substance obtained in (A1) is dried, and thermally treated under a reducing atmosphere such as nitrogen atmosphere containing hydrogen in 1 to 10% by volume. Particularly, in the latter method, the colloidal substance is applied on a substrate to form a film, the film is dried, and thermally treated under a reducing atmosphere to obtain a conductive film. The thermal treatment temperature is usually from room temperature (about 25° C.) to about 800° C.

Examples of the substrate include a resin film as well as glass substrate. When a flake compound has transparency together, use of a transparent substrate gives a transparent conductive film with higher utilization value. Examples of the resin of the resin film include polyolefin resin such as polyethylene (low density, high density), ethylene-propylene copolymer, ethylene-butene copolymer, ethylene-hexene copolymer, ethylene-octane copolymer, ethylene-norbornene copolymer, ethylene-DMON copolymer, polypropylene, ethylene-vinyl acetate copolymer, ethylene-methyl methacrylate copolymer, and ionomer resins; polyester resins such as polyethylene terephthalate, polybutylene terephthalate, and polyethylene naphthalate; nylon-6, nylon-6,6, meta-xylenediamine-adipic acid polycondensate; amide resins such as polymethylmethacrylimide; acrylic resins such as polymethyl methacrylate; styrene-acrylonitrile resins such as polystyrene, styrene-acrylonitrile copolymer, styrene-acrylonitrile-butadiene copolymer, and polyacrylonitrile; hydrophobicized cellulose resins such as cellulose triacetate, and cellulose diacetate; halogen-containing resins such as polyvinyl chloride, polyvinylidene chloride, polyvinylidene fluoride, and polytetrafluoroethylene; hydrogen bonding resins such as polyvinyl alcohol, ethylene-vinyl alcohol copolymer, and cellulose derivative; engineering plastic resins such as polycarbonate resins, polysulfone resins, polyether sulfone resins, polyether ether ketone resins, polyphenyleneoxide resins, polymethylene oxide resins, polyarylate resins, and liquid crystal resins. From the standpoint of lowering gas permeability of air, oxygen, water vapor and the like, preferable are polyolefin resins such as ethylene-norbornene copolymer, and ethylene-DMON copolymer, polyester resins such as polyethylene terephthalate, and polyethylene naphthalate; engineering plastic resins such as polycarbonate resins, polysulfone resins, polyether sulfone resins, polyether ether ketone resins, polyphenyleneoxide resins, polymethylene oxide resins, and liquid crystal resins.

When the conductive layer contains Ti, metal element $M^1$ and O, and $M^1$ represents at least one selected from the group consisting of Nb, Ta, Mo, W and Ru, and the molar ratio of $M^1/Ti$ is more than 0 and not more than 1, the flake compound may be advantageously produced, for example, by a method including the step of (B1).

(B1) A compound including a layer containing Ti, metal element $M^1$ and O and in which the molar ratio of $M^1/Ti$ is within the above-described range (hereinafter, referred to as compound B) is used as a raw material, a chemical treatment is carried out, and a flake compound is exfoliated.

The compound B in the step (B1) is a compound in which Ti in the compound A is replaced with $M^1$ and the molar ratio of $M^1/Ti$ is within the above-described range. Example of the compound B may be represented by $K_{0.8}Ti_{1.7}M_{0.1}O_4$. The chemical treatment in the step (B1) may be advantageously carried out in the same manner as the chemical treatment in the step (A1).

In order to enhance the conductive property of the flake compound exfoliated in the step (B1), the flake compound may be subjected to the reduction treatment in the step (A2). Alternatively, a conductive film may be obtained by applying the colloidal substance in the step (B1) on a substrate to form a film and the film is dried, and is further subjected to thermal treatment under a reducing atmosphere to obtain a higher conductive film.

When a compound represented by $K_{0.8}Ti_{1.8}O_{4-\delta}$ ($0<\delta<0.9$) and containing no $M^1$ is used instead of the compound B in the step (B1), a flake compound including a conductive layer containing oxygen deficient $TiO_2$ is obtained.

The flake compound is useful as a conductive filler. Usually the flake compound is used in admixture with a resin. Exemplary applications of the conductive filler include coating for display, personal computer, word processor, CD player, MD player, DVD player, headphone stereo, cellular telephone, PHS, PDA (mobile information terminal of electronic notebook), transceiver, video camera, digital camera, camera, electronic photocopy machine, printer, and facsimile; structural parts or wrapping material; sheet, film, tray, carrier, wafer basket or package for mounting and handling of semiconductor device; conductive workbench for mounting and handling of electronic instrument parts or precise instrument parts; connector or anisotropic conductive film of flat package type IC, leadless chip carrier type IC, and flexible printed board; conductive paste for electrical connection and pattern formation of printed wiring board; conductive paste for ceramic structure such as inductor, condenser, resonator; antistatic film for display electronics parts such as LCD, electrochromic, electroluminescence, solar cell, light control film, optical shutter; adhesive for mounting of semiconductor device and light emission diode; leak electromagnetic wave shielding film for display such as CRT (cathode ray tube), LCD (liquid crystal display), PDP (plasma display); paint or paste; terminal electrode for electronic parts such as electrode, multilayer ceramic condenser, multilayer inductor, piezoelectric, resistor, and printed wiring board; electrode for battery such as film battery, solar cell, secondary battery, or paint for electrode; and the like.

Exemplary applications of the conductive film including a flake compound include a display (flat panel display such as liquid crystal display (LCD), plasma display (PDP), electroluminescence (EL) device), various light receiving devices and light emitting devices such as solar cell, electrode of electronic device such as transistor, and laser, and additionally, heat ray reflection film for automobile and construction, antistatic film, transparent heat generator for anti-fogging of various cases such as freeze showcase.

EXAMPLES

The present invention is illustrated with reference to the following examples.

Example 1

Potassium carbonate ($K_2CO_3$), titanium dioxide ($TiO_2$) and niobium oxide ($Nb_2O_5$) are weighed and mixed so that the molar ratio of K:Ti:Nb is 0.8:1.7:0.1, and calcined at 1100° C. under a nitrogen atmosphere containing 2% by volume of hydrogen to obtain $K_{0.8}Ti_{1.7}Nb_{0.1}O_4$. $K_{0.8}Ti_{1.7}Nb_{0.1}O_4$ is washed and then stirred in 3.5% hydrochloric acid aqueous solution. The resultant product is recovered, then, dried to obtain a dried product. The dried product is contacted with 1% dimethyl ether amine aqueous solution under stirring to obtain a colloidal substance. The colloidal substance is applied on a resin film substrate using a film applicator, and dried at 80° C. to obtain a conductive film.

Example 2

A colloidal substance is obtained in the same manner as in Example 1 excepting that tetrabutylammonium aqueous solution is used instead of the dimethyl ether amine aqueous solution. A glass substrate is immersed in polydiallyldimethylammmonium chloride aqueous solution and washed with pure water, and the resultant substrate is immersed in the colloidal substance and withdrawn to form a film of the colloidal substance on the substrate, and this is washed with pure water. The operations of immersion, withdrawal and washing are repeated 5 times, and a nitrogen gas is blown for drying to obtain a conductive film.

Example 3

Potassium carbonate ($K_2CO_3$) and titanium dioxide ($TiO_2$) are weighed and mixed so that the molar ratio of K:Ti is 0.8:1.8, and calcined at 1100° C. under a nitrogen atmosphere containing 2% by volume of hydrogen to obtain $K_{0.8}Ti_{1.8}O_{4-\delta}$ ($0<\delta<0.9$). $K_{0.8}Ti_{1.8}O_{4-\delta}$ ($0<\delta<0.9$) is stirred in 3.5% hydrochloric acid aqueous solution. The resultant product is recovered, then, dried to obtain a dried product. The dried product is contacted with dimethyl ether amine under stirring to obtain a colloidal substance. A glass substrate is immersed in polydiallyldimethylammmonium chloride aqueous solution and washed with pure water, and the resultant substrate is immersed in the colloidal substance and withdrawn to form a film of the colloidal substance on the substrate, and this is washed with pure water. The operations of immersion, withdrawal and washing are repeated 5 times, and a nitrogen gas is blown for drying to obtain a conductive film.

Example 4

Potassium carbonate ($K_2CO_3$), lithium carbonate ($Li_2CO_3$) and titanium dioxide ($TiO_2$) are weighed and mixed so that the molar ratio of K:Li:Ti is 0.8:0.27:1.73, and calcined at 1100° C. in air to obtain $K_{0.8}Li_{0.27}Ti_{1.73}O_4$. $K_{0.8}Li_{0.27}Ti_{1.73}O_4$ is stirred in hydrochloric acid aqueous solution. The resultant product is recovered, then, dried to obtain a dried product. The dried product is contacted with tetrabutylammonium aqueous solution under stirring to obtain a colloidal substance. A glass substrate is immersed in polydiallyldimethylammmonium chloride aqueous solution and washed with pure water, and the resultant substrate is immersed in the colloidal substance and withdrawn to form a film of the colloidal substance on the substrate, and this is washed with pure water. The operations of immersion, withdrawal and washing are repeated 5 times, and a nitrogen gas is blown for drying to obtain a film. The film is then thermally treated at 500° C. under a hydrogen atmosphere to obtain a conductive film.

INDUSTRIAL APPLICABILITY

The flake compound of the present invention is used suitably for a conductive film. The flake compound is obtained by carrying out simple operations in an inexpensive production method.

The invention claimed is:

1. A flake compound comprising a conductive layer containing Ti, metal element $M^1$ and O, wherein
    Ti is in a mixed valent state of 3-valent and 4-valent, the molar ratio of $M^1$/Ti is more than 0 and not more than 1, and $M^1$ represents at least one selected from the group consisting of Nb, Ta, Mo, W and Ru.
2. The flake compound according to claim 1, further comprising a layer containing at least one element selected from the group consisting of alkali metal elements and alkaline earth metal elements.
3. A conductive film comprising the flake compound as described in claim 1.
4. The flake compound according to claim 1, wherein the molar ratio of $M^1$/Ti is more than 0 and not more than 0.5.
5. The flake compound according to claim 1, wherein the molar ratio of $M^1$/Ti is more than 0 and not more than 0.25.
6. The flake compound according to claim 1, wherein $M^1$ represents Nb or Ta.

* * * * *